(12) United States Patent
Ryan et al.

(10) Patent No.: US 8,520,683 B2
(45) Date of Patent: Aug. 27, 2013

(54) MANAGING COMMUNICATIONS OVER A SHARED MEDIUM

(75) Inventors: Michael Ryan, Ocala, FL (US); Maulik Bhatt, Ocala, FL (US); Stanley J. Kostoff, II, Ocala, FL (US); Treina Cresse, Mount Dora, FL (US); William E. Earnshaw, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/337,009

(22) Filed: Dec. 17, 2008

(65) Prior Publication Data

US 2009/0154487 A1    Jun. 18, 2009

Related U.S. Application Data

(60) Provisional application No. 61/014,631, filed on Dec. 18, 2007.

(51) Int. Cl.
H04L 12/28 (2006.01)

(52) U.S. Cl.
USPC .................... 370/395.21; 370/445

(58) Field of Classification Search
USPC .......... 370/230, 230.1, 231, 235, 236, 236.1, 370/236.2, 347, 395.21, 395.53, 442, 445, 370/449
See application file for complete search history.

(56) References Cited

U.S. PATENT DOCUMENTS

| | | | | |
|---|---|---|---|---|
| 4,626,634 A | * | 12/1986 | Brahm et al. | 379/28 |
| 5,596,577 A | * | 1/1997 | Perreault et al. | 370/449 |
| 5,905,870 A | | 5/1999 | Mangin et al. | |
| 2005/0114489 A1 | | 5/2005 | Yonge, III et al. | |
| 2010/0020784 A1 | * | 1/2010 | Goldfisher et al. | 370/347 |
| 2012/0026871 A1 | * | 2/2012 | Hu et al. | 370/230 |

FOREIGN PATENT DOCUMENTS

WO    WO 02/37758    5/2002

OTHER PUBLICATIONS

Jamin, Sugih et al., "A Measurement-based Admission Control Algorithm for Integrated Services Packet Networks (Extended Version)." IEEE/ACM Transactions on Networking, Feb. 1997, pp. 1-20.

* cited by examiner

*Primary Examiner* — Andrew Lai
*Assistant Examiner* — Leon Andrews
(74) *Attorney, Agent, or Firm* — DeLizio Gilliam, PLLC

(57) ABSTRACT

Communicating between stations over a shared medium includes: monitoring the shared medium for signals received at a first station that is identified with a local network; storing information at the first station that represents characteristics of the signals received at the first station associated with capacity of the shared medium; monitoring the shared medium for signals received at a second station that is identified with the same local network as the first station; storing information at the second station that represents characteristics of the signals received at the second station associated with capacity of the shared medium; and determining whether a stream of data is allowed to be transmitted over the shared medium between the first station and the second station based on at least one of the stored information from the first station and the stored information from the second station.

22 Claims, 3 Drawing Sheets

MANAGING COMMUNICATIONS OVER A SHARED MEDIUM

CLAIM OF PRIORITY

This application claims priority under 35 USC §119(e) to U.S. Provisional Patent Application Ser. No. 61/014,631, filed on Dec. 18, 2007, the entire contents of which are hereby incorporated by reference.

TECHNICAL FIELD

The invention relates to managing communications over a shared medium.

BACKGROUND

A network of communication stations can share a communication medium (e.g., wires connecting multiple stations or spectrum for transmitting radio signals among stations) using any of a variety of access techniques. Some access techniques (e.g., carrier sense multiple access (CSMA) techniques) include a contention period in which stations contend for use of the medium for transmitting a signal by sensing when the medium is idle. In CSMA techniques, "collisions" sometimes occur when signals from two or more stations overlap. Some CSMA techniques attempt to detect collisions and abort transmission to reduce the negative impact of collisions (e.g., CSMA/CD techniques). Other CSMA techniques include mechanisms to avoid or reduce the probability of collisions (e.g., CSMA/CA techniques). For example, different transmissions may be assigned one of multiple priorities. Access is granted using a Priority Resolution Period in which stations signal the priority at which they intend to transmit, and only the highest priority transmissions are allowed to continue in the contention process. A random backoff mechanism spreads the time over which stations attempt to transmit, thereby reducing the probability of collision.

Some communications over the shared medium are organized as a stream of data (or a "flow" or a "session") that is transmitted over a period of time at a given average data rate. Some streams are time-sensitive and call for a certain amount of available bandwidth to maintain a desired Quality of Service (QoS). Admission control protocols are used to manage whether and how bandwidth is allocated to different streams being transmitted over the shared medium. Some admission control protocols are managed by a central station in a network. An application that provides data to be streamed from a station (e.g., audio, video, or other multimedia streams) makes a request for a stream to be admitted, which may include information characterizing the stream such as an average data rate and a QoS requirement. A station can determine whether the requested stream is to be admitted or rejected based on current usage of the communication medium. Once a stream is admitted, the transmitting station may still need to contend for usage of the communication medium using an access technique such as a CSMA technique. In some networks there are regular time periods during which stations may contend for usage of the communication medium, and other time periods that are designated as contention-free periods in which time slots are allocated based on a predetermined schedule.

SUMMARY

In one aspect, in general, a method for communicating between stations over a shared medium includes: monitoring the shared medium for signals received at a first station that is identified with a local network; storing information at the first station that represents characteristics of the signals received at the first station associated with capacity of the shared medium; monitoring the shared medium for signals received at a second station that is identified with the same local network as the first station; storing information at the second station that represents characteristics of the signals received at the second station associated with capacity of the shared medium; and determining whether a stream of data is allowed to be transmitted over the shared medium between the first station and the second station based on at least one of the stored information from the first station and the stored information from the second station.

Aspects can include one or more of the following features.

The characteristics of the signals received at the first station and the characteristics of the signals received at the second station include characteristics of signals on the shared medium that are associated with the local network and characteristics of signals on the shared medium that are not associated with the local network.

The first and second stations are identified with the local network at least by sharing common encryption information not available to stations outside of the local network.

The characteristics of the signals received at the first station and the characteristics of the signals received at the second station include duration of the signals.

The characteristics of the signals received at the first station and the characteristics of the signals received at the second station are derived from overhead information in the signals.

The characteristics of the signals received at the first station and the characteristics of the signals received at the second station are derived from a data rate in the overhead information.

Determining whether the stream of data is allowed to be transmitted over the shared medium between the first station and the second station is based on the stored information from the first station and the stored information from the second station.

The stored information from the first station has been transmitted to the second station and the second station determines whether the stream of data is allowed to be transmitted over the shared medium.

Determining whether the stream of data is allowed to be transmitted over the shared medium between the first station and the second station comprises determining whether to admit the stream of data to begin transmitting over the shared medium.

Determining whether the stream of data is allowed to be transmitted over the shared medium between the first station and the second station comprises estimating from the stored information from the first station and the stored information from the second station a capacity of the shared medium being used by other streams of data of the same or higher priority as said stream of data.

Determining whether the stream of data is allowed to be transmitted over the shared medium between the first station and the second station is based on the stored information from the first station, and the characteristics of the signals received at the first station associated with capacity of the shared medium comprise information in the signals indicating whether available capacity of the shared medium in a vicinity of the first station is low.

Determining whether the stream of data is allowed to be transmitted over the shared medium between the first station and the second station comprises determining whether to suspend the stream of data from transmitting over the shared medium.

The information in the signals comprises information indicating whether a buffer at a station other than the first station is over a threshold.

Determining whether the stream of data is allowed to be transmitted over the shared medium between the first station and the second station is further based on whether a buffer at the first station is over a threshold.

Determining whether to suspend the stream of data from transmitting over the shared medium comprises determining whether a priority of data transmitted from the buffer at the first station is higher than a priority of data transmitted from the buffer at the station other than the first station.

The stream of data is suspended if the buffer at the first station is over a threshold and the priority of data transmitted from the buffer at the first station is not higher than a priority of data transmitted from any buffer at any station other than the first station from which a signal has been received indicating that that buffer is over a threshold.

Signals received at the first station and the signals received at the second station each include a delimiter at the start of a frame.

The delimiter includes a check sequence for verification that the delimiter was correctly received.

Time during which the shared medium is monitored at the first station and time during which the shared medium is monitored at the second station comprise repeating intervals of time.

The data in the stream includes at least one of video data, audio data, and voice data.

In another aspect, in general, a system for communicating between stations over a shared medium includes: a first station identified with a local network, configured to monitor the shared medium for signals received at the first station, and store information that represents characteristics of the signals received at the first station associated with capacity of the shared medium; a second station identified with the same local network as the first station, configured to monitor the shared medium for signals received at a second station, and store information that represents characteristics of the signals received at the second station associated with capacity of the shared medium. At least one of the first and second station is configured to determine whether a stream of data is allowed to be transmitted over the shared medium between the first station and the second station based on at least one of the stored information from the first station and the stored information from the second station.

Among the many advantages of the invention (some of which may be achieved only in some of its various aspects and implementations) are the following.

Managing communications over a network include managing whether communications such as data streams are admitted (admission control) and managing available bandwidth for those streams that have been admitted (bandwidth management). Techniques for admission control provide more efficient utilization of contention-based and/or contention-free time allocations by allowing different portions of a network to fully utilize the available bandwidth, taking into account signals from different local networks that may affect the available bandwidth. Each station accessing a medium may potentially have a different "view" of network traffic in its vicinity (which includes stations in the same local network and potentially also stations in different local networks coupled to the same medium). Each station is able to monitor and to identify traffic by any particular station of the stations in its vicinity. For example, each of two endpoint stations that will participate in a connection carrying a video stream may have a different view of traffic, depending on the physical layout of their local network. One reason that stations even in the same local network may have different views of traffic is that channel impairments on the medium, such as high attenuation levels between stations, can essentially form a barrier between stations limiting the propagation of signals so that certain stations are "hidden" from certain other stations.

By enabling a pair of endpoint stations to admit (or deny) entrance of a stream to the network depending on the bandwidth consumption observed in their vicinities, the network is able to gain a higher aggregate throughput, network-wide, compared with scheme that uses a centralized approach. For example, in a centralized approach, a single station may assign bandwidth based on bandwidth consumption observed at that station using a time division multiple access (TDMA) schedule in which only one station may be transmitting during a certain assigned time interval. By taking into account the characteristics of different vicinities over one or more local networks as viewed by multiple stations, multiple stations may be transmitting at the same time even in the same local network without interfering with each other.

Techniques for bandwidth management provide the ability to respond to changing conditions in a network by allowing streams of lower priority to behave "altruistically" by halting or pausing transmission to provide greater bandwidth to maintain reliability and/or QoS of higher priority streams. By simultaneously monitoring stream-based and non-stream-based traffic at multiple stations, the stations are able determine whether any streams belonging to a given local network are having trouble with delivery. The members of the local network learn in real time when streams are getting into trouble (e.g., are not meeting their QoS requirements as indicated by the state of a buffer) and are able to act simultaneously to resolve the problem. This resolution can be performed based on multiple priority levels. Within each priority level, the determination of which stream to terminate on behalf of the others can be randomly made. But in cases where a high-priority stream is in trouble, the transmitter of a lower-priority stream can "altruistically" suspend its stream to free up the bandwidth that was occupied by the lower priority stream. This suspension typically allows the other stream to get out of trouble because the amount of buffer memory used on the troubled transmitter will reduce as it continues to transmit data. The network is also able to respond to changing channel conditions that affect how much bandwidth is available. For example, a home powerline network may respond to changing conditions due to power drawn by appliances. A home wireless network may respond to changing conditions due to electromagnetic interference from appliances such as microwave ovens.

The techniques allow for efficient use of the medium shared by stations in a local network since the stations do not need to rely on a single central managing station to monitor the available bandwidth. For example, to a central managing station, the medium can appear to be full or over-subscribed because the station may take into account all transmissions from all other stations in the local network even if some of those stations cannot hear (do not receive transmissions from) one another. Whereas, by allowing different pairs of stations that would not interfere with each other to transmit simultaneously, otherwise unused channel capacity can be utilized.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

Figure 1:
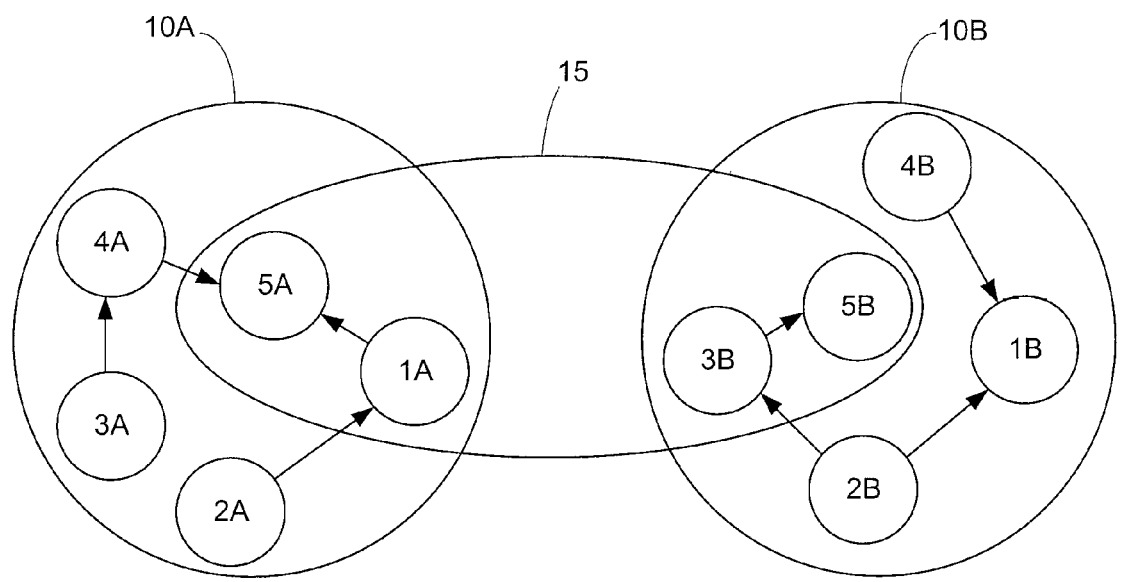
FIG. 1 is a schematic diagram of a network configuration.

A local communication network may enable a group of communication stations (e.g., computing devices, or audio-visual devices) in the same vicinity such as a home or office, for example, to communicate among each other. In some cases, communication stations may be in the same vicinity, but may be members of different local networks such that they do not communicate directly with each other. FIG. 1, shows a first local network 10A of communication stations 1A-5A that are in communication over a shared communication medium, and a second local network 10B of communication stations 1B-5B that are in communication over a shared communication medium. Multiple local networks may exist in close proximity, for example, in a multi-family dwelling such as an apartment building. While signals transmitted in one local network are not meant for stations in a neighboring local network (e.g., the signals may carry encrypted data that can only be decrypted by other stations in the same local network), those signals may nevertheless cause disruption in the communication medium of the neighboring local network. For example, in a wireless network stations from different networks may be close enough to receive signals from each other before they have attenuated to undetectable levels. In a wired network, such as a powerline communication network, signals from one site may reach stations in another site that is coupled by electrical power distribution lines. FIG. 1, shows an example of a group 15 of stations in the same vicinity (some of which are members of different local networks) that can detect signals from other stations in the group 15.

Some local networks (LNs) may include a station that is designated as a "central coordinator" (CCo) station. The CCo is a communication station that is selected to provide certain coordination functions for at least some of the other stations in the local network. A set of stations operating under the coordination of a single CCo is called a coordinated local network (CLN). A set of stations communicating without a designated CCo is called an uncoordinated local network (ULN). Functions performed by the CCo include: authentication of stations upon joining the CLN, provisioning of identifiers for stations, and scheduling and timing of medium access. For example, the CCo broadcasts a repeated beacon transmission from which the stations in the CLN can determine scheduling and timing information. This beacon transmission includes fields that carry information used by the stations to coordinate communication. Though the format of each of the repeated beacon transmission is similar, the content typically changes in each transmission. The beacon transmission is repeated approximately periodically, and, in some implementations, is synchronized to a characteristic of the communication medium (e.g., zero crossings of a sinusoidal power distribution waveform).

In a CLN, the CCo can manage the bandwidth used by the stations in the CLN. However, if multiple neighboring local networks are both managed by a respective CCo, problems may arise in managing the bandwidth for the local networks since some of the bandwidth may be used by neighbor network stations not under control of the CCo. Another potential issue is that a CCo is not necessarily able to determine when two stations in the same local network may potentially interfere with each other, or when two stations are "hidden" from each other (communicating via other stations and not receiving signals directly from each other).

Admission control and bandwidth management techniques described herein enable bandwidth to be utilized efficiently taking into account signals received at the transmitting and receiving stations, including signals originating from the same local network and signals originating from outside the local network. A station in a given local network may not be able to communicate with stations that are members of a different local network, but the station can still overhear their transmissions to monitor bandwidth usage. The techniques can be applied in either a ULN in which there is no CCo, or in a CLN in which there is a CCo.

In either a coordinated or uncoordinated network the admission control and bandwidth management techniques can include monitoring the medium for signals representing existing streams and storing monitoring information used to make the decisions about admitting new streams into a given local network and managing the existing streams. A station in a given local network is able to monitor streams from the same local network and other local networks by receiving a signal of sufficient strength and correctly demodulating and decoding a portion of the information (e.g., in a delimiter that contains frame control information) as verified by a check sequence. Information about the stream can be derived from the delimiter and stored as monitoring information. Signals that are not strong enough to be decoded successfully may also have an effect on bandwidth management. For example, if a signal received by a station is not strong enough to be decoded successfully, but still strong enough to cause errors in signals transmitted in the vicinity of the station, the signal may lead to errors resulting in more conservative channel estimation, longer time for delivery of admitted streams, and potentially suspension or pausing of some streams according to the bandwidth management techniques. In some cases, a signal too weak to be successfully received by a station may raise a noise floor, but does not significantly interfere with streams transmitted in the vicinity of that station.

Communication System Protocols and Architecture

In some implementations, the stations use protocols that include features to improve performance when the communication medium exhibits varying transmission characteristics. For example, when the communication medium includes AC power lines in a house, optionally coupled to other media (e.g., coaxial cable lines), the communication channel between any two stations provided by the communication medium may exhibit periodic and/or sudden variation in noise characteristics, frequency response, and/or available bandwidth. Periodic variation can be caused by the AC line signal, and sudden variation can be caused by appliances being powered on, for example.

To improve performance and QoS stability in the presence of varying channel characteristics, such as power line noise, the CCo synchronizes the beacon transmissions with the frequency of the AC line (e.g., 50 or 60 Hz). There are typically variations in the phase and frequency of the AC line cycle from the power generating plant and local noise and load changes. This synchronization enables the time slots assigned to the various stations relative to a time reference in the beacon transmission to use consistent channel adaptation optimized for a particular phase region of the AC line cycle. The CCo also provides information in the beacon transmissions including a time stamp that can be used by the stations to synchronize local clocks with respect to a master network clock located at the CCo.

Another aspect of mitigating potential impairments caused by the varying channel characteristics involves using a robust signal modulation format such as orthogonal frequency division multiplexing (OFDM), also known as Discrete Multi Tone (DMT). OFDM is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

Any of a variety of communication system architectures can be used to implement the portion of the network interface module that converts data to and from a signal waveform that is transmitted over the communication medium. An application running on a station provides and receives data to and from the network interface module in segments. A "MAC Protocol Data Unit" (MPDU) is a segment of information including overhead and payload fields that the Media Access Control (MAC) layer has asked the physical (PHY) layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

There can be multiple types of PPDU structures, depending on the PHY protocol being used. For example, in some PPDU structures the signals can use denser OFDM carrier frequency spacing and correspondingly longer symbols.

Figure 2:
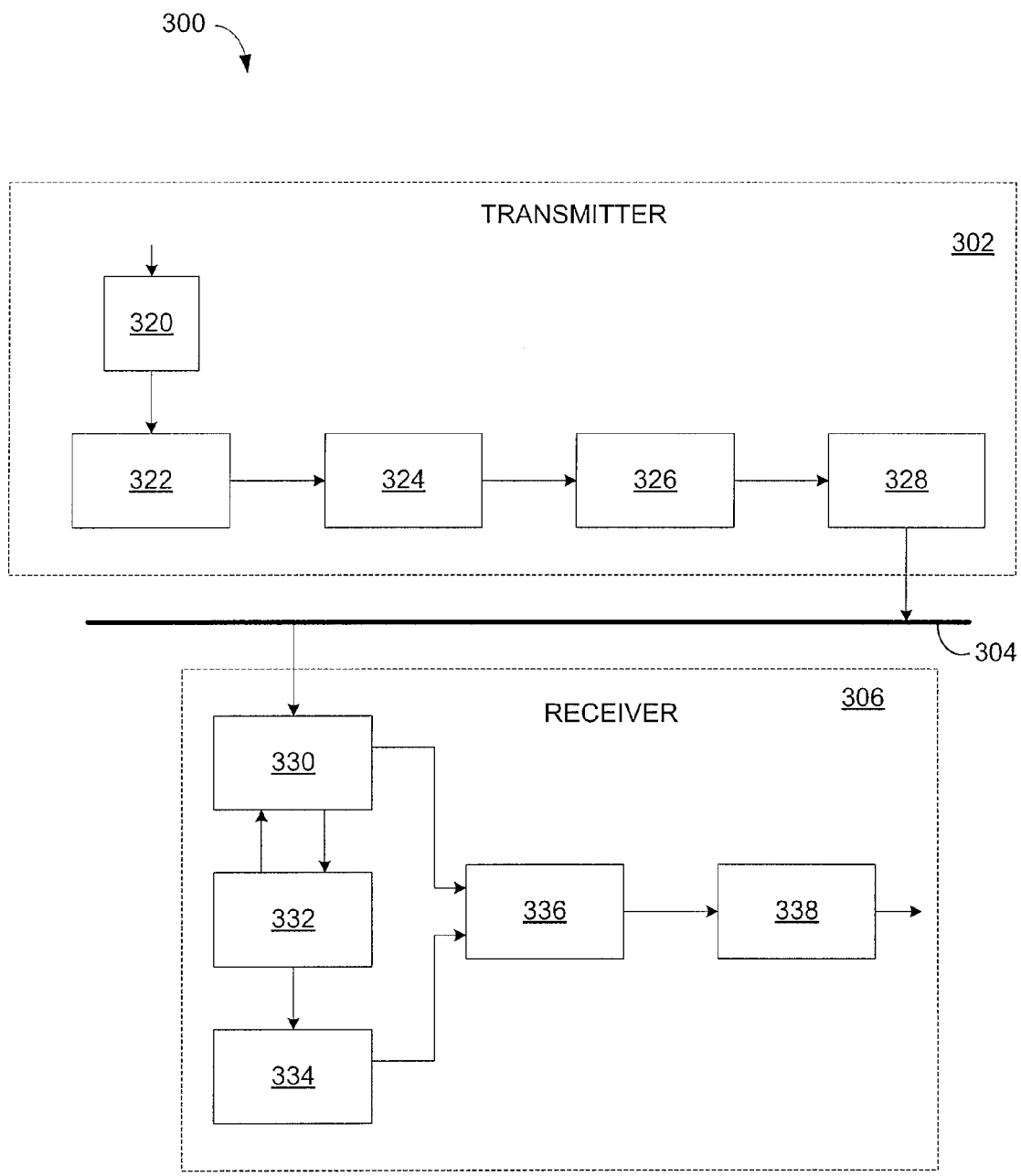
FIG. 2 is a block diagram of a communication system.

Referring to FIG. 2, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau;t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

Beacon Transmissions

Various stations in a network may generate regular beacon transmissions for various purposes. A repeated beacon transmission from a CCo to each of the stations in a CLN is called a Central Beacon (CB) transmission. The stations may communicate with each other in time periods between CB transmissions, provided the power line channel characteristics between any two communicating stations permits it.

One of the main functions of CB transmission is to carry medium allocation (or scheduling) information. The scheduling information allocates some of the time between CB transmissions as a contention period during which stations may contend for access to the power line medium. The scheduling information also allocates a contention-free period during which times slots are assigned to particular stations for access to the power line medium.

As described in more detail below, the CB transmission is synchronized with respect to the AC line cycle such that the time between CB transmissions (or "beacon period") is based on the underlying AC line cycle frequency. The CB transmission can be synchronized to the AC line cycle by transmitting the CB at a fixed time interval from a detectable feature of the power line waveform such as a zero crossing. The beacon period can be set to any multiple of a half of the AC line cycle period, for example, by waiting for a given number of zero crossings.

In some cases it is desirable to increase the beacon period to make more efficient use of the medium by reducing the percentage of time devoted to sending the "overhead" information in the CB transmission. There is also overhead information associated with transmissions from the stations. It may also be desirable to keep the beacon period small enough to provide a desired number transmission opportunities in a given length of time. Thus, the beacon period can be selected according to a trade-off between keeping overhead low and latency between transmission opportunities low. For example, in some implementations the beacon period is selected to be twice the AC line cycle period. In this case, when operating in power line environments with an AC line cycle frequency of 60 Hz, the beacon period would be approximately 33.33 msec. When operating in power line environments with an AC line cycle frequency of 50 Hz, the beacon period would be approximately 40 msec. Variations in the beacon period may occur due to drift in the AC line cycle frequency.

Figure 3:
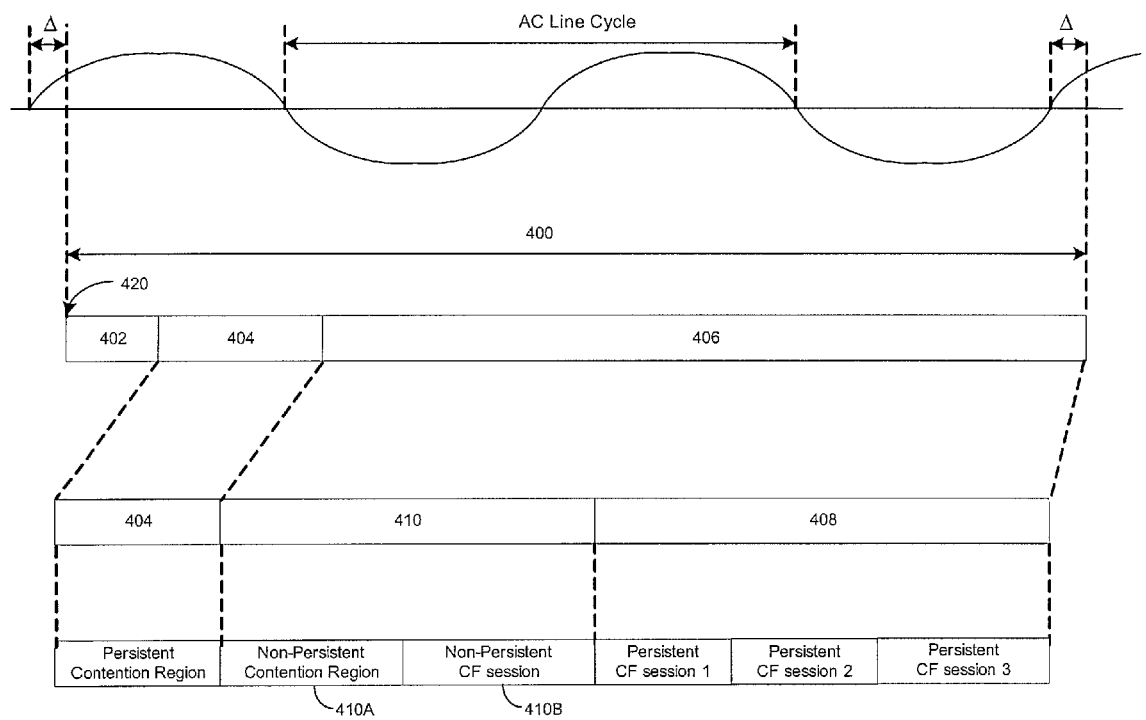
FIG. 3 is a timing diagram of a beacon period.

FIG. 3 shows the structure of an exemplary beacon period 400 which consists of a Beacon Region 402 followed by a Contention Region 404 and a Reserved Region 406. Optionally, the Beacon Region 402 can be followed by any number of Contention Regions and Reserved Regions in any order. The Contention Region 404 is a time in which stations can contend for permission to transmit using a shared medium access protocol such as CSMA/CA.

The Reserved Region 406 includes a contention-free period (CFP) 408 which includes time slots assigned for use by predetermined stations (e.g., using a TDMA protocol). The CFP 408 can be divided into contiguous time slots for each of the participating stations. Alternatively, the CFP 408 can be divided into sessions, each of which is divided into time slots for each of the participating stations. Therefore, a station may be allocated multiple times slots during the CFP 408.

The Contention Region 404 and the CFP 408 within the Reserved Region 406 are "persistent" in that they typically remain valid over multiple beacon periods. This persistent scheduled time allows stations that miss a beacon period for some reason to use previously stored schedule information, as described in more detail below. The Reserved Region 406 also includes a "non-persistent" period 410 that is not guaranteed to be valid for more than one beacon period. This non-persistent scheduled time allows rapid response to urgent time slot allocation requests, and time for network maintenance activities. For example, the non-persistent period 410 can include a time slot for a station to take a turn in transmitting a Discover Beacon used for setting up and maintaining the network. The non-persistent period 410 can use either or both of contention or contention-free access as needed. In this example, the non-persistent period 410 includes a non-persistent contention region 410A and a non-persistent contention-free "Extra Allocation" session 410B.

The Beacon Region 402 is the time allocated for the CCo to broadcast the CB transmission to the stations in the CLN. The CB transmission is sent using an OFDM waveform including preamble, frame control fields, and a beacon payload. In this example, the start 420 of the CB transmission (and thus the start of the Beacon Region 402) is synchronized to the AC line cycle at predetermined offset of A from the zero crossing. The beacon payload carries information used by the stations to determine the timing of the Reserved Regions and Contention Regions. In this example, one Contention Region 404 immediately follows the Beacon Region 402. If one or more Reserved Regions are present, additional Contention Regions may also be present in the beacon period 400.

The CFP 408 time slot assigned to a transmitting station includes time after transmission of an MPDU during which the receiving station (or stations) can send a selective acknowledgement (SACK) according to a Selective Repeat Automatic Retransmission Request (SR-ARQ) approach. Each PPDU waveform representing an MPDU includes a preamble, a frame control field, and a payload made up of multiple segments or PHY blocks (PBs) that are encrypted independently. The preamble and frame control field together are called the start-of-frame (SOF) delimiter. Each PB is contained in its own FEC Block. An MPDU may contain variable number of FEC blocks, depending on the data rate and payload duration. A SACK can be transmitted in response to a single MPDU, or a burst of multiple MPDUs (e.g., four) can be sent with a single SACK in response.

For example, within a time slot allocated to a transmitting station, the station may send multiple PPDUs each spanning an interval designated by the receiving station for a given channel adaptation. Each PPDU includes a SOF delimiter that can be used by the receiver to estimate phase and amplitude distortion within that adaptation interval for coherent demodulation. While a single long PPDU within a time slot may have lower overhead, transmitting multiple PPDUs enables each PPDU to use a different adaptation and provides a more accurate estimate of phase and amplitude distortion, which is likely to change in each adaptation interval. However, a single SACK can be used to acknowledge all of the MPDUs within the time slot.

Admission Control and Bandwidth Management

Admission control and bandwidth management policies can be used to admit and manage traffic in a network with or without a CCo station, and can be used with any of a variety of channel access protocols. In some implementations, the policies are used for a network that uses a contention-based channel access protocol, to provide prioritized QoS for traffic such as video streams. For example, the channel access protocol may be a CSMA protocol that does not share time with any contention-free (e.g., TDMA) periods, or a CSMA protocol within a contention period of a TDMA schedule, as described above. In some implementations, the policies are used for network that uses a contention-free channel access protocol.

The admission control and bandwidth management policies can be applied selectively to streams and other traffic of a given type. For example, streams can be assigned a channel access class, and streams assigned to a given class can be managed according to a corresponding set of policies. The admission control and bandwidth management polices for high-bandwidth streams may not apply to certain types of low-bandwidth traffic, such as overhead communications between the transmitter and receiver associated with applying a policy for streams (e.g., determining whether to admit a stream). The total available bandwidth capacity of the communication medium can be divided among the various classes (e.g., as time slots within a repeated schedule). For the low-bandwidth traffic, a nominal amount of capacity can be explicitly reserved in a dedicated class, for example, or capacity can be implicitly reserved due to conservative estimation of capacity available for streams in other classes. For a given class that is being managed according to a set of admission control and bandwidth management policies, streams can be further differentiated by being assigned to one of multiple subclasses having different priorities.

As an example of a priority-based policy for a class with multiple subclasses of different priority, the policy may eject an existing lower priority stream when a higher priority stream is admitted, if that is required to meet the higher priority stream's delivery requirements. In cases where all existing managed streams and the stream to be added are of the same priority, a tie-breaking scheme can be used (such as a random selection between admitting the stream or ejecting one of the existing streams).

The admission control policy for a given stream is jointly performed by the transmitting station requesting admission of a new stream and its intended receiving station. Each station can include a Monitoring module that monitors the medium to obtain monitoring information, and a Stream Manager module that determines when streams are to be ejected and participates with other stations in the procedure to decide whether to admit a stream. The monitoring information includes estimates of bandwidth being used by currently active streams. Both the available capacity and the bandwidth of individual streams can be expressed in units of time, for example, as the amount of time needed during each beacon period for transmitting the stream(s). The transmitting and receiving stations have available a nominal communication bandwidth between them to be able to exchange (low-bandwidth) messages about whether to set up the (high-bandwidth) stream. If either station determines that there is insufficient remaining capacity on the medium to support the stream's requested bandwidth requirements, the stream is not admitted. As an example, if the receiving station barely hears a neighboring network's high priority stream and the transmitting station doesn't, the receiving station may refuse admission of a low priority stream if it would interfere with the neighboring network's high priority stream.

All of the stations in a local network can be configured to repeatedly monitor the medium for streams from the same or a different local network and from the various channel access classes. Each station maintains monitoring information to keep track of the streams of the class being managed, as well as streams and other traffic of classes that may be using significant bandwidth even though they may not be managed according to the same policies. For example, a channel access class CA2 corresponds to a class being managed, and channel access classes CA1 and CA3 correspond to a classes not being managed. Traffic at class CA2 includes the streams that are being managed. Traffic at class CA3 is not being managed, but is monitored since it may be using significant bandwidth (e.g., for beacon transmissions or time-sensitive traffic such as VoIP). Traffic at class CA1 is by definition has a lower priority than traffic sent at either class CA2 or class CA3 and so the presence of any traffic sent at class CA1 in this example is ignored. A station monitors the medium for an SOF delimiter and processes the information that can be decoded from the frame control field. If the frame corresponds to a class that is being monitored, the station records relevant information in entries of a monitoring information data structure (e.g., an array) for streams and other traffic being monitored. In a given entry, the station writes information such as a station identifier identifying the transmitting station, a stream identifier identifying the stream being transmitted from the transmitting station (including its class and priority), and a local network identifier identifying the local network to which the transmitting station belongs. If an entry already exists corresponding to a detected stream, the entry can be updated. The estimate of bandwidth being used by a stream can be inferred from information in the frame control (e.g., if the frame control includes a data rate or payload size), or the estimate can be calculated based on an observed length of the frame including any payload (e.g., by assuming the length of the frame corresponds to bandwidth allotted to the stream). In some implementations, a station can account for bandwidth for a stream that is inferred to exist even if signals from the stream itself are not detected. For example, if a station detects acknowledgement frames identifying a stream that has not been identified, the station can attempt to estimate the bandwidth of the stream (e.g., based on information derived from the acknowledgements) and account for the estimated bandwidth.

A station can monitor the medium repeatedly for predetermined intervals of time to ensure that it will capture most of the transmissions of the SOF delimiter of stations that are within the vicinity (i.e., any station that can be heard). The monitoring intervals can be contiguous intervals spanning one or more beacon periods, or in non-contiguous intervals made up of multiple time slots within successive beacon periods. The total time over which the medium is monitored can be selected, for example, based on the minimum time desired to start a stream from the time at which monitoring begins. The total time can be selected to allow enough time to take into account statistical variation in traffic patterns. For example, the monitoring interval can take place over ten 33 ms beacon periods (for a total of 330 ms) if variation is on the order of a few beacon periods. The monitoring interval can then repeat after some repetition delay (e.g., a few seconds).

When a transmitting station attempts to admit a new stream to be sent to a receiving station, the transmitting and receiving stations exchange monitoring information. Since the monitoring process is ongoing, typically at least one of the stations will have tracked the medium recently and will already have the necessary monitoring information stored. In an exemplary admission procedure, the transmitting station sends a request to admit the stream of a given bandwidth along with its stored monitoring information to the receiving station. The receiving station combines the monitoring information with its own stored monitoring information, or (if monitoring is in progress or there is no recently stored monitoring information) combines the monitoring information with information derived from any signals received over the medium during subsequent monitoring. This combined monitoring information reflects information about streams that can be heard by either the transmitting station or the receiving station or both. The combining may involve deleting duplicate entries or consolidating duplicate entries (e.g., taking the maximum bandwidth estimate) for streams heard by both the transmitting and receiving station. The receiving station then determines whether sufficient capacity (e.g., measured in time) remains available to admit the stream. Alternatively, the receiving station can respond to the request by sending its monitoring information to the transmitting station, and the transmitting station can determine whether sufficient capacity remains available to admit the stream.

For priority-based policies, even if there is not currently sufficient capacity to admit a new stream, lower priority streams can be terminated to make available additional capacity for admitting a higher priority stream. The following is an exemplary set of rules in a priority-based policy for admission control of streams at class CA2.

1. Data transmitted at class CA3 (e.g., beacon transmissions) is accounted for (i.e., wire time is accumulated) but transmissions at class CA3 have higher priority and are not affected due to transmission of a stream running at class CA2.

2. If sufficient composite wire time considering only streams of equal or higher priority exists given the combined viewpoints of the transmitter and the receiver, the new stream is admitted.

3. In all other cases a new stream is not admitted.

The following three examples apply these rules according to the monitoring information shown in Table 1 for a transmitter (TX) requesting admission of a stream being sent to a receiver (RX), assuming a 33 ms beacon period, and assuming three priority levels for sub-classes of CA2 traffic: P3 (highest priority), P2, and P1 (lowest priority). The monitoring information in Table 1 records bandwidth used as time used per 33 ms beacon period.

The context of the examples is shown in FIG. 1. The transmitter TX is station 2A in local network 10A sending a stream to the receiver RX, which is station 1A. Station 3B in local network 10B is sending a stream station 5B and is receiving a stream from station 2B. The group 15 of stations in the same vicinity are able to "hear" each other directly (e.g., receive signals at high enough signal strength to potentially cause interference), although in this example they cannot necessarily all exchange data (stations in local network 10B may be using a different encryption key than that used by stations in local network 10A, so they cannot demodulate payload data transmitted by those stations). The stations 1A and 5A are able to determine the priority of a stream transmitted from station 3B and the amount of bandwidth (or time) being used by the stream.

TABLE 1

| Streams to admit | TX streams | RX streams |
| --- | --- | --- |
| 1 ms P1 | 12 ms P3 | <Not heard> |
|  | <Not heard> | 12 ms P3 |
|  | <Not heard> | 6 ms P2 |
| 12 ms P3 | 12 ms P3 | 12 ms P3 |
|  | 8 ms P3 | 8 ms P3 |
|  | <Not heard> | 4 ms P2 |
|  | <Not heard> | 1 ms P1 |
| 2 ms P1 | 12 ms P3 | 12 ms P3 |
|  | 10 ms P3 | <Not heard> |
|  | <Not heard> | 10 ms P2 |

In the first example, the stream to be admitted is a 1 ms stream with priority P1. The monitoring information indicates that TX can hear a 12 ms P3 stream and RX can hear a 12 ms P3 stream and a 6 ms P2 stream. In this example, the stream is admitted because sufficient time exists in the beacon period taking into account the time used by the streams heard by both TX and RX (30 ms).

In the second example, the stream to be admitted is a 12 ms stream with priority P3. The monitoring information indicates that both TX and RX can hear a 12 ms P3 stream and an 8 ms P3 stream, and just RX can hear a 4 ms P2 stream and a 1 ms P1 stream. In this example, the stream is admitted because the composite wire time used by streams of equal (or higher) priority (20 ms) will permit operation of the new stream even though this will cause the lower priority P1 and P2 streams to be eliminated eventually due to bandwidth management protocols, described in more detail below.

In the third example, the stream to be admitted is a 2 ms stream with priority P1. The monitoring information indicates that both TX and RX can hear a 12 ms P3 stream, just TX can hear a 10 ms P3 stream, and just RX can hear a 10 ms P2 stream. In this example, the stream is not admitted because the medium would be oversubscribed if the new stream were added since there is already 32 ms of higher priority traffic.

The protocols for bandwidth management (also executed by the Stream Manager module) are similar to those of admission control, in the sense that they rely on monitoring of the vicinity in which a station is operating to make decisions about which streams should keep running. With bandwidth management, each station monitors the streams being transmitted from that station. When the monitored streams are being delivered without trouble, the bandwidth management process takes no action. But when one or more of the streams in the vicinity do run into trouble delivering the data in their streams, the bandwidth management process will cause one or more existing stations in the vicinity to suspend the delivery of one or more of their streams. This "pause" in delivery can last for an indefinite period or the suspended stream(s) may resume after a short time.

A station can detect "trouble" in delivery of the data in its stream in various ways. In some implementations, a transmitting station maintains a set of transmit buffers per stream. Each buffer is large enough to store a certain time window worth of data. The window size can be selected, for example, according to the amount of time (e.g., 300 ms) needed to ride through changing conditions and can allow enough time for transmission of some frames to be unsuccessful and then to be re-tried. The transmitter keeps track of these buffers and knows when the amount of pending data approaches the overflow condition in a buffer. This threshold (e.g., 280 ms) is called the "high watermark" for a buffer. When channel conditions degrade, data is delivered more slowly and the amount of pending data creeps upward. If channel conditions subsequently improve, data is delivered quicker and the amount of pending data declines.

When the amount of pending data in the transmit buffer of a given stream exceeds the high watermark, the transmitter starts setting an "in trouble" flag in a field within the SOF delimiter of frames of the given stream to indicate that available capacity of the shared medium in the vicinity of the station that receives the flag is low. Since this field is carried in SOF, this flag can be detected by all stations in the vicinity (even frames with encrypted payloads from other local networks) to indicate that this stream is in trouble, and that data loss may result unless some action is taken (e.g., at least one stream of lower priority is suspended). Various procedures could be used for determining which stream to suspend (e.g., lowest sub-priority stream using most amount of time, least amount of time, etc.). In some implementations there can be a user-assigned full or partial orderings of streams to help decide which streams will suspend before certain other streams. Streams could be suspended randomly based on whichever station wins contention for use of the medium (e.g., according to CSMA/CA). The stream that suspends can announce the suspension in a field of a frame before it suspends.

In one example, there is one priority P3 stream, and three priority P1 streams. The station sending the priority P3 stream announces trouble in a flag in the SOF delimiter, but still contends for use of shared medium. If the station wins, it uses the medium and may or may not clear the flag depending on whether the delivery is still in trouble. If a station sending a P1 stream wins the medium next, the station will suspend in response to detecting the "in trouble" flag and announce the suspension. In response to the announcement, existing stations clear their record of the "in trouble" flag. If the station sending the P3 stream wins use of the medium again, the station will send further "in trouble" flags if its delivery of the P3 stream is still in trouble. When the amount of pending data declines below the high watermark, the station clears the "in trouble" flag in the SOF delimiter for frames associated with the stream.

The stations in a vicinity can cooperate to get streams out of trouble, irrespective of the local network that owns the station that is transmitting the troubled stream. A priority-based scheme can be used to ensure that all streams of lower priority are suspended before a stream at higher priority begins dropping frames. In cases where all lower-priority streams have paused, insufficient wire time has been freed as a result, and all remaining streams are of the same priority as the one that is in trouble, the troubled stream and the remaining streams compete equally to determine which one should be suspended. The troubled stream or one of the others at the same priority may be suspended. In cases where no streams of lower or equal priority exist, the transmitter may suspend the troubled stream itself and no interaction with other stations is required.

In an exemplary procedure for preparing frames of a stream for transmission, a station takes the following actions:
 When adding frames to a transmit buffer for a stream, the station checks the high watermark and if the pending PB count has exceeded this value, the stream is marked as being in trouble.
 If the stream is in trouble, the station checks to see if the stream has a priority equal to or lower than the priority of any other stream that is known to be in trouble. If that is true, the station sets information associated with this stream such that no more frames will be transmitted for that stream and will advertise that the stream has suspended by setting a field in the SOF delimiter to SUSPENDED. Otherwise (its priority is not the lowest in the network) the station will advertise that this stream is in trouble by setting a field in the SOF delimiter to IN_TROUBLE.
 If the stream is not in trouble, the station clears the IN_TROUBLE flag in the SOF delimiter just in case the stream previously was in trouble.

In an exemplary procedure for receiving frames, a station takes the following actions:
 If the IN_TROUBLE flag is set in the SOF delimiter and the station inspects the contents of a variable and determines that it has no present knowledge that a stream is in trouble, it sets a variable to remember that the stream is in trouble.
 If the frame was sent for a stream that the station knows was previously in trouble based on inspection of a variable, and if the stream is no longer in trouble, then the station clears the variable that contained the identity of the stream that was in trouble and takes no further action.
 If a higher priority stream is detected as being in trouble after a station has recorded the identity of a lower priority stream, the station clears the variable that contains the identity of the lower priority stream and records the identity of the higher-priority stream. This apparent loss of information is resolved by the nature of the bandwidth management procedure.
 If the SOF delimiter indicates that the transmitted stream has been suspended, its stream identifier will be removed from the list of vicinity-wide streams. The station will clear its knowledge that any stream is in trouble and will also clear any suspension flag associated with any stream that it is attempting to send.

Once sufficient wire time has been freed, a stream that was in trouble will have sufficient time to deliver its data and so its transmit buffer will begin to empty. Once the amount of pending data declines past the low watermark for the buffer, the transmitter will clear the IN_TROUBLE flag in the SOF delimiter sent in frames associated with that buffer. This tells receiving stations that the transmitted stream is no longer in trouble.

The following procedure describes how the delivery of streams that were suspended by the bandwidth management process can be resumed. The Stream Manager module in the transmitter sets a timer that would randomly lapse in a few hundred milliseconds. For example, the random value might be selected from a range between 300 ms and 1 second. At the lapse of this timer, the Stream Manager module would issue a request to restart data transmission for this stream. Although some frame loss may have occurred for the suspended stream (because a host may have continued to push data into its transmit buffer), it may be much less time-consuming to resume a paused stream compared with tearing a stream down and subsequently setting it up again. This process would be attempted once. The Stream Manager module would then inform the host that the stream had been dropped if the attempt to resume was not successful.

These procedures for admission control and bandwidth management can be configured to co-exist with a variety of protocols used by other stations. For example, the monitoring information can take into account region(s) in a beacon period or other form of TDMA schedule and track monitoring information for stations in the vicinity transmitting only during a limited CSMA period within the schedule.

Many other implementations of the invention other than those described above are within the invention, which is defined by the following claims.

What is claimed is:

1. A method comprising:
   monitoring a shared medium for signals received at a first station that is identified with a local network;
   determining, at the first station, first information based at least in part upon characteristics of the signals received at the first station, the first information associated with available capacity of the shared medium and including estimates by the first station of bandwidth used by at least a first active signal stream received at the first station;
   receiving, at the first station, second information from a second station that is identified with the same local network as the first station, wherein the second information is based at least in part upon characteristics of signals received over the shared medium by the second station, the second information associated with available capacity of the shared medium and including estimates by the second station of bandwidth used by at least a second active signal stream received at the second station;
   estimating, based at least in part on the first information and second information, an estimated used capacity of the shared medium being used by ones of at least the first and second active signal streams having a same or higher priority as a new stream of data; and
   determining, at the first station, whether the new stream of data is allowed to be transmitted over the shared medium between the first station and the second station based, at least in part, on the estimated used capacity of the shared medium.

2. The method of claim 1, wherein the characteristics of the signals received at the first station and the characteristics of the signals received at the second station include characteristics of signals on the shared medium that are not associated with the same local network as the first station and the second station.

3. The method of claim 2, wherein the first and second stations are identified with the local network at least by sharing common encryption information associated with the local network.

4. The method of claim 1, wherein the characteristics of the signals received at the first station and the characteristics of the signals received at the second station include duration of the signals.

5. The method of claim 1, wherein the characteristics of the signals received at the first station and the characteristics of the signals received at the second station are derived from overhead information in the signals.

6. The method of claim 5, wherein the characteristics of the signals received at the first station and the characteristics of the signals received at the second station are derived from a data rate in the overhead information.

7. The method of claim 1, wherein said new stream of data comprises a new stream of data to be transmitted from the first station to the second station.

8. The method of claim 1, wherein determining whether the new stream of data is allowed to be transmitted over the shared medium between the first station and the second station comprises determining whether to admit the new stream of data to begin transmitting over the shared medium.

9. The method of claim 1, wherein the characteristics of the signals received at the first station includes information in the signals indicating whether the available capacity of the shared medium in a vicinity of the first station is low.

10. The method of claim 9, wherein determining whether the new stream of data is allowed to be transmitted over the shared medium between the first station and the second station comprises determining whether to suspend the new stream of data from transmitting over the shared medium.

11. The method of claim 9, wherein the information in the signals comprises information indicating whether a buffer at a station other than the first station is over a threshold.

12. The method of claim 1, wherein determining whether the new stream of data is allowed to be transmitted over the shared medium between the first station and the second station is further based on whether a buffer at the first station is over a threshold.

13. The method of claim 10, wherein determining whether to suspend the new stream of data from transmitting over the shared medium comprises determining whether a priority of data transmitted from a first buffer at the first station is higher than a priority of data transmitted from another buffer at a station other than the first station.

14. The method of claim 13, wherein the new stream of data is suspended if the first buffer at the first station is over a threshold and the priority of data transmitted from the first buffer at the first station is not higher than a priority of data transmitted from any other buffer at any other station other than the first station from which a signal has been received indicating that the other buffer is over a threshold.

15. The method of claim 1, wherein signals received at the first station and the signals received at the second station each include a delimiter at the start of a frame.

16. The method of claim 15, wherein the delimiter includes a check sequence for verification that the delimiter was correctly received.

17. The method of claim 1, wherein time during which the shared medium is monitored at the first station and time during which the shared medium is monitored at the second station comprise repeating intervals of time.

18. The method of claim 1, wherein the data in the new stream includes at least one of video data, audio data, and voice data.

19. A system comprising:
    a first station identified with a local network, the first station configured to:
      monitor a shared medium for signals received at the first station;
      determine first information based at least in part upon characteristics of the signals received at the first station, the first information associated with available capacity of the shared medium and including estimates by the first station of bandwidth used by at least a first active signal stream received at the first station;
      receive second information from a second station that is identified with the same local network as the first station, wherein the second information is based at least in part upon characteristics of signals received over the shared medium by the second station, the second information associated with available capacity of the shared medium and including estimates by the second station of bandwidth used by at least a second active signal stream received at the second station; estimate, based at least in part on the first information and second information, an estimated used capacity of the shared medium being used by ones of at least the first and second active signal streams having a same or higher priority as a new stream of data; and
      determine whether the new stream of data is allowed to be transmitted over the shared medium between the first station and the second station based, at least in part, on the estimated used capacity of the shared medium.

20. The method of claim 1, wherein the new stream of data is a stream of data to be transmitted from the second station to the first station.

21. A first station for coupling to a shared medium, the first station configured to determine whether to allow a new stream of data to be transmitted over the shared medium from the first station to a second station based, at least in part, on first information indicative of an amount of capacity of the shared medium that is used by first active signal streams monitored by the first station, and second information received from a second station, the second information indicative of an amount of capacity of the shared medium that is used by second active signal streams monitored by the second station.

22. The method of claim 1, further comprising:

determining an estimated remaining available capacity of the shared medium in a vicinity of each of the first station and the second station based, at least in part, on the estimated used capacity of the shared medium being used by the ones of at least the first and second active signal streams having the same or higher priority as the new stream of data, wherein determining whether the new stream of data is allowed to be transmitted over the shared medium between the first station and the second station is further based, at least in part, on the estimated remaining available capacity of the shared medium.

* * * * *